US012538065B2

(12) United States Patent
He

(10) Patent No.: US 12,538,065 B2
(45) Date of Patent: Jan. 27, 2026

(54) EARPHONE WITH PLURALITY OF SUPPORTING PORTIONS

(71) Applicant: Shenzhen Dancing Future Technology Ltd., Shenzhen (CN)

(72) Inventor: Qing He, Shenzhen (CN)

(73) Assignee: SHENZHEN DANCING FUTURE TECHNOLOGY LTD., Shenzhen (CN)

( * ) Notice: Subject to any disclaimer, the term of this patent is extended or adjusted under 35 U.S.C. 154(b) by 258 days.

(21) Appl. No.: 18/275,425

(22) PCT Filed: Jun. 30, 2021

(86) PCT No.: PCT/CN2021/103890
§ 371 (c)(1),
(2) Date: Aug. 2, 2023

(87) PCT Pub. No.: WO2022/166094
PCT Pub. Date: Aug. 11, 2022

(65) Prior Publication Data

US 2024/0107219 A1 Mar. 28, 2024

(30) Foreign Application Priority Data

Feb. 3, 2021 (CN) ......................... 202110147858.0

(51) Int. Cl.
*H04R 1/10* (2006.01)

(52) U.S. Cl.
CPC .................................... *H04R 1/105* (2013.01)

(58) Field of Classification Search
CPC ... H04R 1/105; H04R 1/1016; H04R 2201/10
See application file for complete search history.

(56) References Cited

U.S. PATENT DOCUMENTS

2010/0086167 A1 4/2010 Akihiko et al.
2013/0188803 A1* 7/2013 Shaanan .................. H04R 1/10
381/74

FOREIGN PATENT DOCUMENTS

CN 201011738 Y 1/2008
CN 203968330 U 11/2014
(Continued)

OTHER PUBLICATIONS

Translation of CN 209330353 U. “A Bluetooth Earphone” CHEN (Year: 2019).*

(Continued)

*Primary Examiner* — Brian Ensey
(74) *Attorney, Agent, or Firm* — Astute IP Law Group

(57) ABSTRACT

An earphone with a plurality of supporting portions includes a main cavity, an ear hook, and a secondary cavity; the main cavity is connected to the secondary cavity through the ear hook; the main cavity is used for mounting of a loudspeaker, and located on an anterior side of an ear; a sound outlet is provided in a position of the main cavity close to an ear canal; the ear hook is used for surrounding a superior side and a posterior side of the ear; and the secondary cavity is used for making contact with the posterior side of the ear. With the design of supporting regions of the earphone, the earphone fits the ear better, stress is more uniform, the earphone is prevented from falling off or getting loose easily, fatigue of the ear caused after long-time wearing is relieved, and the comfort of wearing is improved.

10 Claims, 10 Drawing Sheets

(56) References Cited

FOREIGN PATENT DOCUMENTS

| | | | |
|---|---|---|---|
| CN | 106233748 | A | 12/2016 |
| CN | 207340125 | U | 5/2018 |
| CN | 209330353 | U | 8/2019 |
| CN | 214014497 | U | 8/2021 |
| CN | 214014498 | U | 8/2021 |
| JP | 2003-078984 | A | 3/2003 |
| JP | 2015070468 | A | 4/2015 |
| JP | 2015207956 | A | 11/2015 |
| JP | 2023530725 | A | 7/2023 |
| WO | 2010116510 | A1 | 10/2010 |
| WO | 2013094484 | A1 | 6/2013 |
| WO | 2019164553 | A1 | 8/2019 |
| WO | 2020220970 | A1 | 11/2020 |

OTHER PUBLICATIONS

Translation of CN 205545807U. "An Ear Bluetooth Headset" Wang (Year: 2016).*
Notice of Allowance in Chinese Patent Application No. 202120309869.X, mailed Jul. 20, 2021, 2 pages.
International Search Report of PCT Patent Application No. PCT/CN2021/103890 issued on Nov. 1, 2021.
Office Action for Chinese Patent Application No. 202110147858.0, mailed on Aug. 28, 2024, 17 pages.
Office Action for Japanese Patent Application No. 2023-547055, mailed on Oct. 29, 2024, 10 pages.

* cited by examiner

EARPHONE WITH PLURALITY OF SUPPORTING PORTIONS

The present application is based on and claims priority to the Chinese Patent Application No. 202110147858.0, filed on Feb. 3, 2021, the entire contents of which are incorporated herein by reference.

FIELD OF TECHNOLOGY

The present application relates to the technical field of earphones, and in particular, to an earphone with a plurality of supporting portions.

BACKGROUND

For wearing of existing common ear-hook earphones, there are two main forms of fixation as follows:

1. An earphone is hooked to a human ear for fixation only through a curved-shaped ear hook portion, and is prone to getting loose and may not be firmly worn in the case of movement of a human body or a head.

2. Through a connection of the ear hook portion and an in-ear/semi-in-ear main body, the number of fixing points within the cavum concha and an entrance of an ear canal is increased. Although this method may achieve the purpose of firm wearing, swelling and fatigue in the ear may be caused when wearing for a slightly longer period of time.

Neither of these two forms may provide users with a comfortable and firm wearing experience for a long time.

Understanding the composition of each part of the human ear facilitates studies on wearing of earphones. The specific structure of the human ear is shown in FIG. 1 to FIG. 3. The ear has the following areas: an antihelix 40, a superior part of a tragus 41, a supratragic notch 42, skin on an anterior side of the helix 43, an anterior part of the helix 44, a superior auricular root 45, a groove of the superior antihelix crus 46, a prominence of the triangular fossa 47, a prominence of the cavum concha 48, a groove of the helix crus 49, a prominence of the cymba concha 50, and a groove of the antihelix 51.

SUMMARY

The present application provides an earphone with a plurality of supporting portions in order to overcome the defects in the prior art.

In order to achieve the above purpose, the present application adopts the following technical solutions:

An earphone with a plurality of supporting portions includes a main cavity, an ear hook, and a secondary cavity; the main cavity is connected to the secondary cavity through the ear hook; the main cavity is used for mounting of a loudspeaker, and located on an anterior side of an ear; a sound outlet is provided in a position of the main cavity close to an ear canal; the ear hook is used for surrounding a superior side and a posterior side of the ear; and the secondary cavity is used for making contact with the posterior side of the ear.

According to a further technical solution, the main cavity is provided with a first supporting portion for abutting against an antihelix; and the first supporting portion is in surface contact or point contact with an auricle.

According to a further technical solution, the main cavity is provided with a second supporting portion for abutting against the skin on an anterior side of a helix, an anterior part of the helix, a supratragic notch, and a superior part of a tragus; and the second supporting portion is in a surface contact manner.

According to a further technical solution, the ear hook is provided with a third supporting portion for abutting against a superior auricular root, a groove of the superior antihelix crus, and a prominence of the triangular fossa; and the third supporting portion is in a surface contact manner.

According to a further technical solution, the secondary cavity is provided with a fourth supporting portion for abutting against a prominence of the cymba concha, a groove of the helix crus, a groove of the antihelix, and a prominence of the cavum concha; and the fourth supporting portion is in a surface contact manner.

According to a further technical solution, the ear hook is made of a memory material.

According to a further technical solution, the secondary cavity is provided with a mounting cavity for mounting of an electronic component.

According to a further technical solution, the main cavity, the ear hook and the secondary cavity are wrapped with a soft rubber layer.

According to a further technical solution, the ear hook is of a tubular structure.

According to a further technical solution, a rear sound hole is provided in one side of the main cavity facing away from the ear canal.

Compared with the prior art, the present application has the following beneficial effects: According to the present application, with the design of supporting regions of the earphone, the earphone fits the ear better, stress is more uniform, the earphone is prevented from falling off or getting loose easily, fatigue of the ear caused after long-time wearing is relieved, and the comfort of wearing is improved.

The above description is merely an overview of the technical solutions of the present application, which may be implemented according to the contents of the specification in order to make the technical means of the present application be more clearly understood. In addition, in order to make the above and other objectives, features and advantages of the present application more clearly understood, preferred embodiments are set forth in detail below.

DESCRIPTION OF THE EMBODIMENTS

Figure 1:
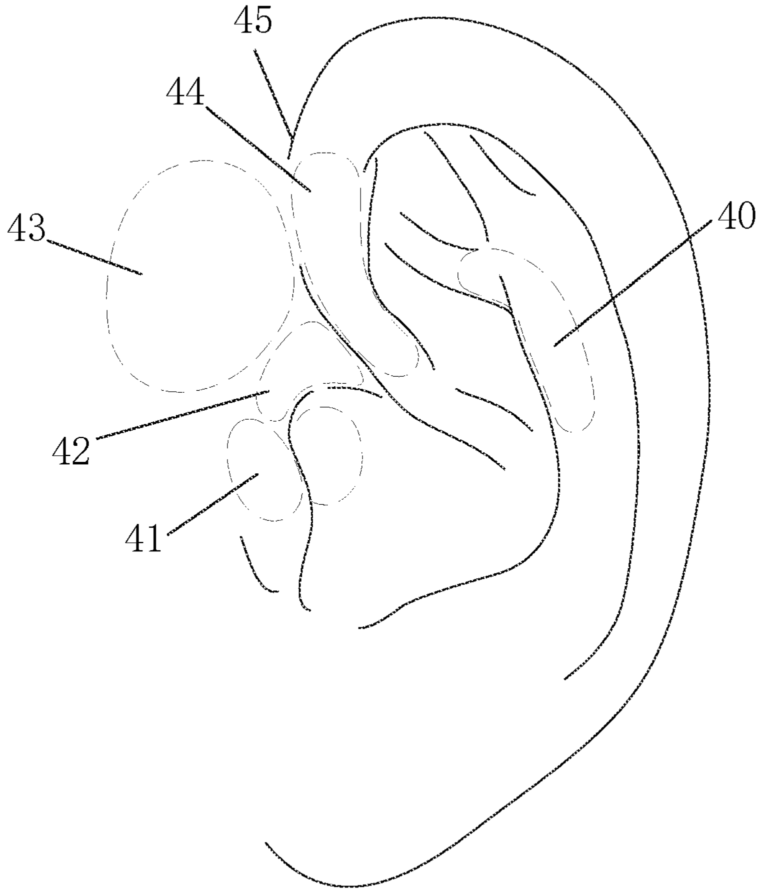
FIG. 1 is a front view of an ear structure.
Figure 2:
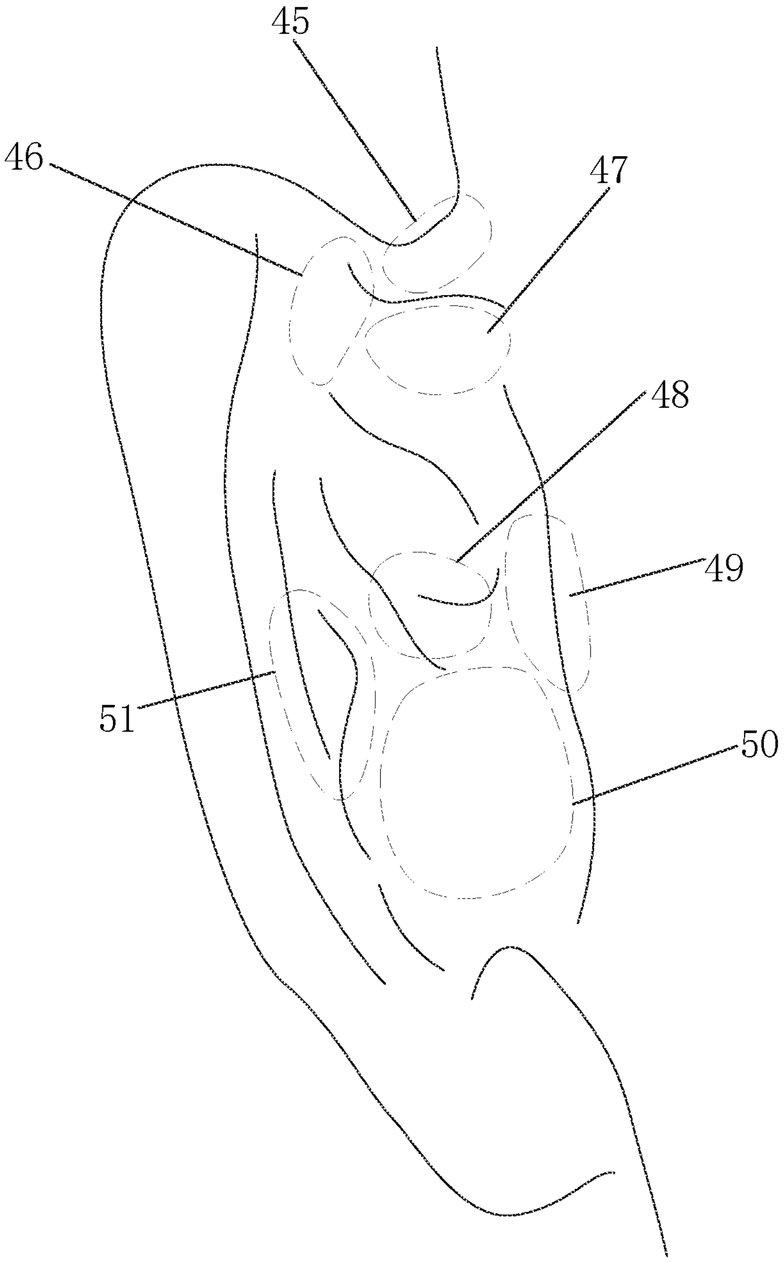
FIG. 2 is a rear view of an ear structure.
Figure 3:
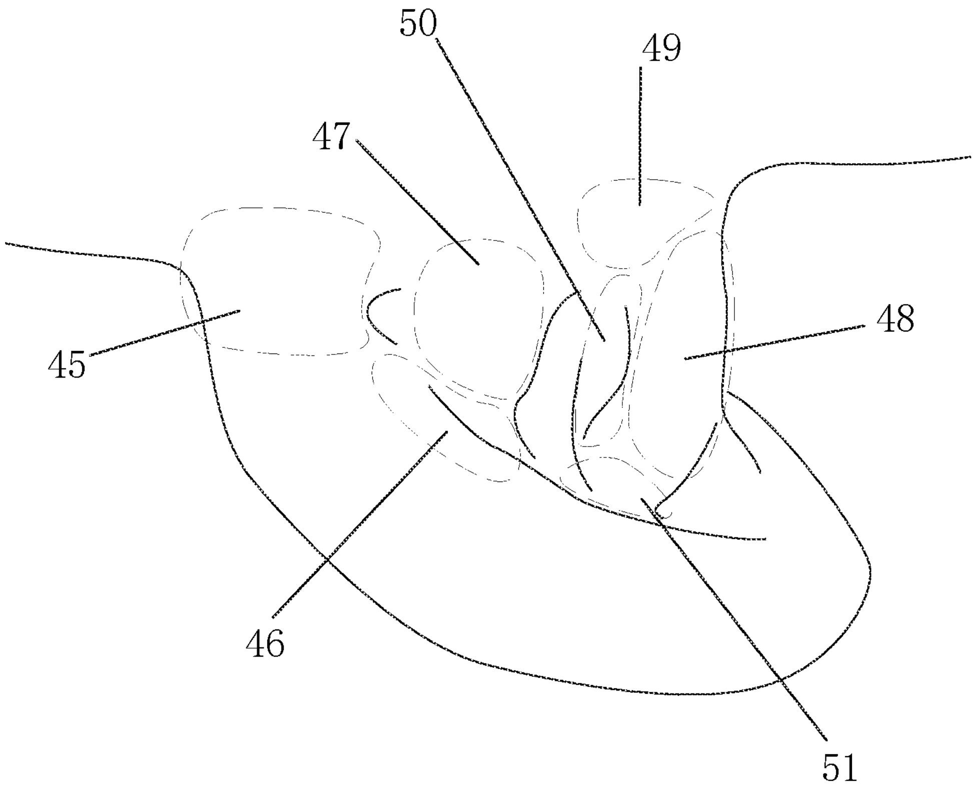
FIG. 3 is a top view of an ear structure.
Figure 4:
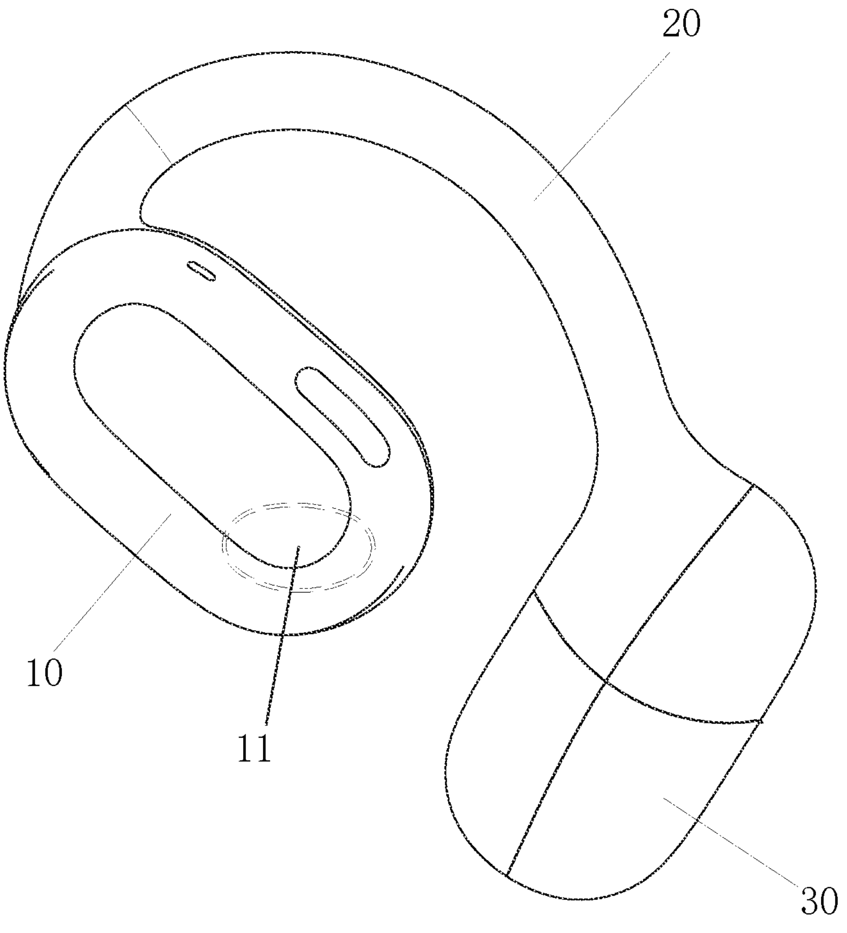
FIG. 4 is a three-dimensional diagram of an earphone with a plurality of supporting portions according to the present application.
Figure 5:
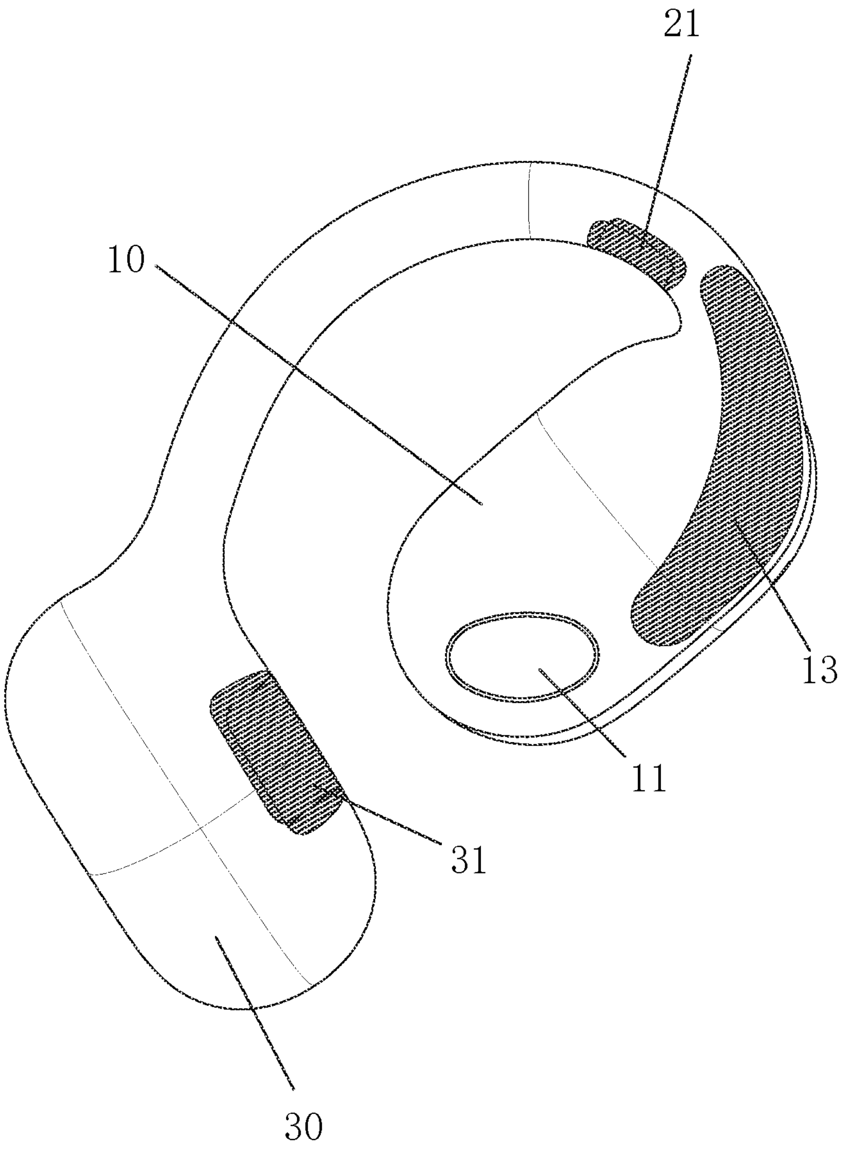
FIG. 5 is a schematic location diagram of supporting portions of an earphone with a plurality of supporting portions according to the present application.
Figure 6:
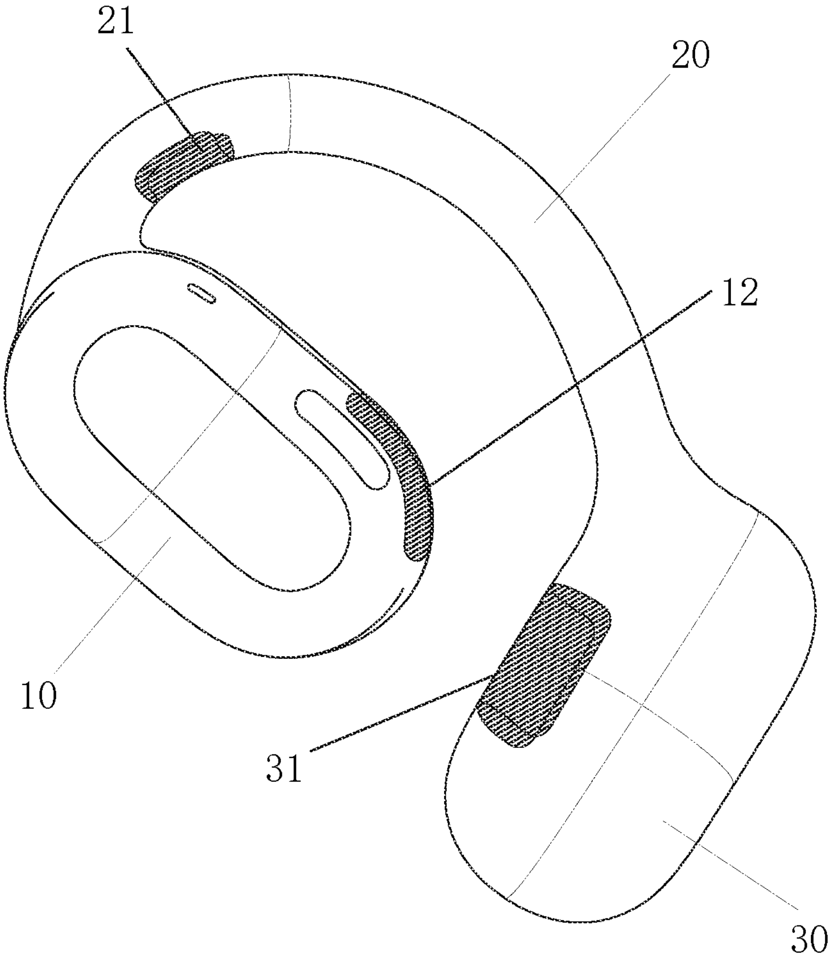
FIG. 6 is a schematic location diagram of supporting portions of an earphone with a plurality of supporting portions from another perspective according to the present application.
Figure 7:
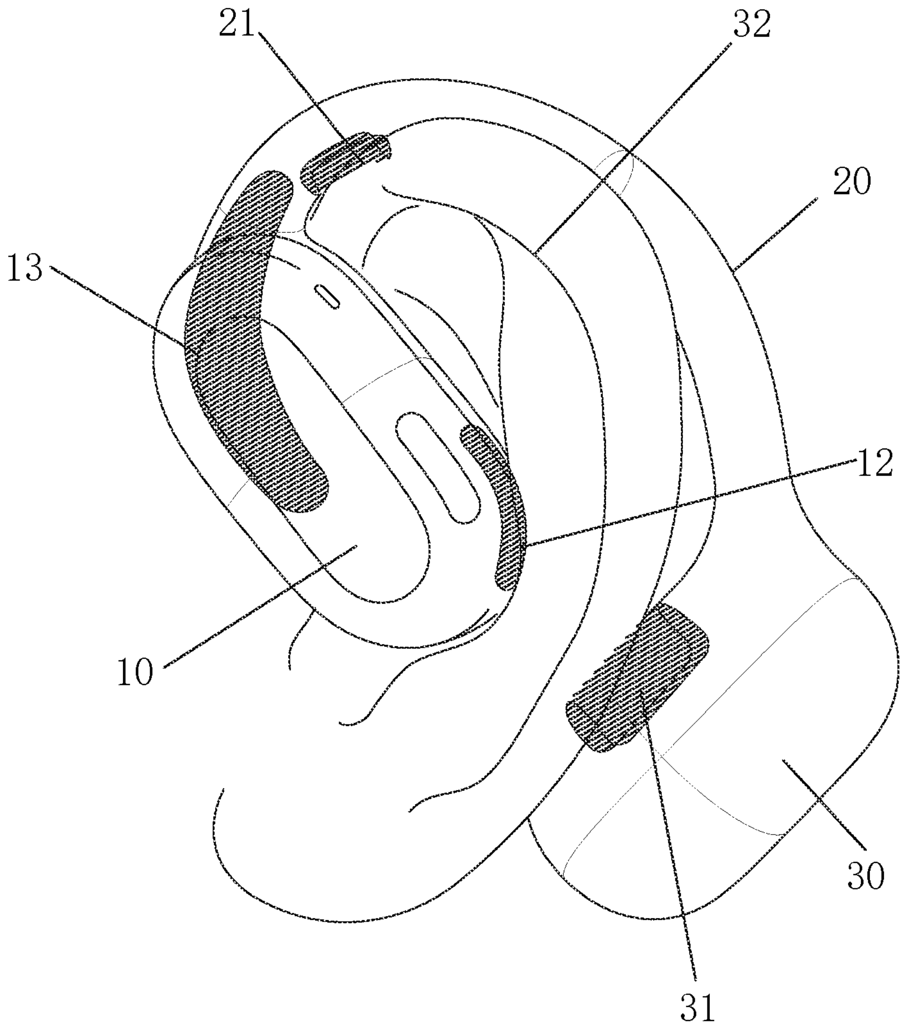
FIG. 7 is a schematic diagram of contact between an ear and supporting portions of an earphone with a plurality of supporting portions according to the present application.
Figure 8:
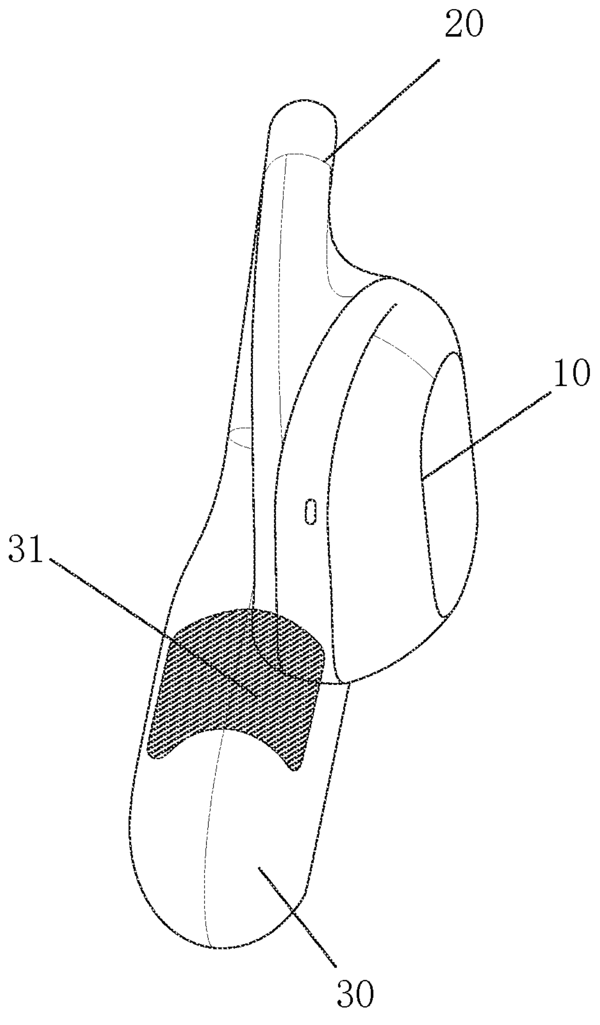
FIG. 8 is a schematic location diagram of a fourth supporting portion of an earphone with a plurality of supporting portions according to the present application.

In order to make the objectives, technical solutions, and advantages of the present application more clear, the present application is further described in detail below in combination with the accompanying drawings and the description of the embodiments.

The technical solutions according to the embodiments of the present application will be clearly and completely described below with reference to the accompanying drawings according to the embodiments of the present application. Apparently, the embodiments described hereinafter are merely a part of the embodiments of the present application, rather than all the embodiments. Based on the embodiments of the present application, all other embodiments derived by a person skilled in the art without any creative effort fall within the scope of protection of the present application.

In the description of the present application, it is to be understood that the terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", and the like indicate orientations or positional relationships based on the orientations or positional relationships shown in the accompanying drawings, are merely for convenience in describing the present application and simplifying the description, and are not intended to indicate or imply that the referred apparatus or element must have a particular orientation or be constructed and operated in a particular orientation, and thus they should not be construed as limiting the present application.

Furthermore, the terms "first" and "second" are merely provided for descriptive purposes and are not to be construed as indicating or implying relative importance or implicitly indicating the number of technical features indicated. Thus, a feature defined as "first" or "second" may explicitly or implicitly include one or more of these features. In the description of the present application, "a plurality of" refers to two or more, unless expressly and specifically limited otherwise.

In the present application, unless expressly stated or limited otherwise, the terms "mounted", "connected", "connecting", "fixing", and the like are to be interpreted broadly. For example, it may be a fixed connection, a detachable connection, or an integral connection; or it may be a mechanical connection or an electrical connection; or it may be a direct connection, or an indirect connection through an intermediate medium; or it may be the communication between two elements or the interaction relationship between two elements. For a person of ordinary skill in the art, the specific meaning of the above-mentioned terms in the present application may be understood according to specific situations.

In the present application, unless expressly stated or limited otherwise, a first feature being "above" or "below" a second feature may include that the first feature and the second feature are in direct contact, or that the first feature and the second feature are not in direct contact but are in contact via another feature therebetween. Furthermore, a first feature being "above", "over" and "on" a second feature includes that the first feature is over and above the second feature, or merely indicates that the first feature is horizontally higher than the second feature. The first feature being "below", "under" and "beneath" the second feature includes the first feature being under and below the second feature, or merely indicates that the first feature is horizontally lower than the second feature.

In the description of this specification, reference to the description of the terms "one embodiment", "some embodiments", "example", "specific example", or "some examples", etc. means that the specific features, structures, materials, or characteristics described in connection with the embodiment or example are included in at least one embodiment or example of the present application. In this specification, schematic representations of the above terms should not be construed as necessarily referring to the same embodiment or example. Furthermore, the specific features, structures, materials, or characteristics described may be combined in any suitable manner according to any one or more embodiments or examples. In addition, the different embodiments or examples described in this specification may be combined and integrated by a person skilled in the art.

FIG. 2 to FIG. 10 are accompanying diagrams of the present application.

This embodiment provides an earphone with a plurality of supporting portions. Referring to FIG. 4 to FIG. 8, the earphone includes a main cavity 10, an ear hook 20, and a secondary cavity 30. The main cavity 10 is connected to the secondary cavity 30 through the ear hook 20. The main cavity 10 is used for mounting of a loudspeaker, and the main cavity 10 is located on an anterior side of an ear 32. A sound outlet 11 is provided in a position of the main cavity 10 close to an ear canal. The ear hook 20 is used for surrounding a superior side and a posterior side of the ear 32. The secondary cavity 30 is used for making contact with the posterior side of the ear 32. As the ear hook 20 is in contact with the superior side and the posterior side of the ear 32, the main cavity 10 is in contact with the anterior side of the ear 32, and the secondary cavity 30 is in contact with the posterior side of the ear 32, the whole earphone structure covers the ear 32 from the anterior side, the superior side and the posterior side, so as to be worn more firmly.

The main cavity 10 extends to the position of the ear canal from the anterior side of the ear 32, and the main cavity 10 has a contact face with the ear 32, so that wearing is firmer. In this embodiment, the main cavity 10 extends to an entrance of the ear canal in a tilting manner from a superior anterior position of the ear 32, and due to the tilting arrangement manner, a user may control the main cavity 10 conveniently.

Specifically, the main cavity 10 is provided with a first supporting portion 12 for abutting against an auricle. The first supporting portion 12 is in surface contact or point contact with an antihelix 40. The first supporting portion 12 is disposed at an end portion of the main cavity 10, so that the main cavity 10 is supported by a force. The first supporting portion 12 is disposed at a position close to the sound outlet 11 of the main cavity 10, so that the main cavity 10 may keep stable during operation of the loudspeaker, and vibration interference with the main cavity 10 caused by the loudspeaker is avoided.

The main cavity 10 is provided with a second supporting portion 13. The second supporting portion 13 is used for abutting against the skin on an anterior side of a helix 43, an anterior part of the helix 44, a supratragic notch 42, and a superior part of a tragus 41. The second supporting portion 13 is a side face of the main cavity 10 close to a human head. The second supporting portion 13 is in a surface contact manner, so that a contact area of the main cavity 10 and the ear 32 is increased, point contact is avoided, a contact force is dispersed, and the comfort of wearing is improved.

The ear hook 20 is provided with a third supporting portion 21. The third supporting portion 21 is used for abutting against a superior auricular root 45, a groove of the superior antihelix crus 46, and a prominence of the triangular fossa 47. The ear hook 20 is of a curved structure, having a degree of curvature the same as that of a root of the human ear 32. The third supporting portion 21 is in a surface contact manner, so that the contact area is increased, the pressure on the ear 32 caused by the earphone is reduced, and the comfort is improved. A cross section of the ear hook 20 is circular, oval, racetrack-shaped, etc., and may also be in other special shapes with arc transition, so that a contact surface is enlarged during wearing, and the comfort of wearing is improved. The ear hook 20 is of the curved structure, which may be formed by splicing a plurality of arc-shaped structures, and has arc transition, thereby being similar to a contour of the ear 32.

Since the third supporting portion 21 bears most of the weight of the earphone, the comfort of wearing may be improved by enlarging the contact surface of the third supporting portion 21. The third supporting portion 21 not only is in contact with the superior auricular root 45, the groove of the superior antihelix crus 46, and the prominence of the triangular fossa 47, but also is in contact with a side of the head.

The secondary cavity 30 is provided with a fourth supporting portion 31. The fourth supporting portion 31 is used for abutting against a prominence of the cymba concha 50, a groove of the helix crus 49, a groove of the antihelix 51, and a prominence of the cavum concha 48. The fourth supporting portion 31 is a side face facing the posterior side of the ear 32. The fourth supporting portion 31 is in a surface contact manner, so that the comfort of wearing is improved. The fourth supporting portion 31 not only is in contact with the prominence of the cymba concha 50, the groove of the helix crus 49, the groove of the antihelix 51, and the prominence of the cavum concha 48, but also is in contact with a side of an afterbrain.

The secondary cavity 30 is provided with a cavity for mounting of an electronic component. The electronic component may be a battery, a circuit board, etc. In order to achieve a longer battery life of the earphone, a size of the secondary cavity 30 is designed to be as large as possible to accommodate a battery of a large size. When the earphone is worn, the secondary cavity 30 extends towards an earlobe, and an extension direction is a length direction of the secondary cavity 30. An angle of 120° to 150° is formed between a tangential line of a junction of the secondary cavity 30 and the ear hook 20 and an axis of the secondary cavity 30 in the length direction, so that the secondary cavity 30 may hook an inferior side of the ear 32, and the earphone is not prone to falling off when worn.

Preferably, the ear hook 20 is made of a memory material, so that relative positions of the main cavity 10, the ear hook 20 and the secondary cavity 30 may be adjusted, and after the adjustment, a shape formed after the adjustment may be kept.

Preferably, the ear hook 20 is of a tubular structure for a wire electrically connected to the electronic component such as a battery and the loudspeaker to pass through.

Preferably, the main cavity 10, the ear hook 20 and the secondary cavity 30 are wrapped with a soft rubber layer, thereby being skin-friendly during wearing.

A rear sound hole is provided in one side of the main cavity 10 facing away from the ear canal, so that a sound effect of the earphone is improved. A pickup hole for a microphone is further provided in an outer side of the main cavity 10.

Figure 9:
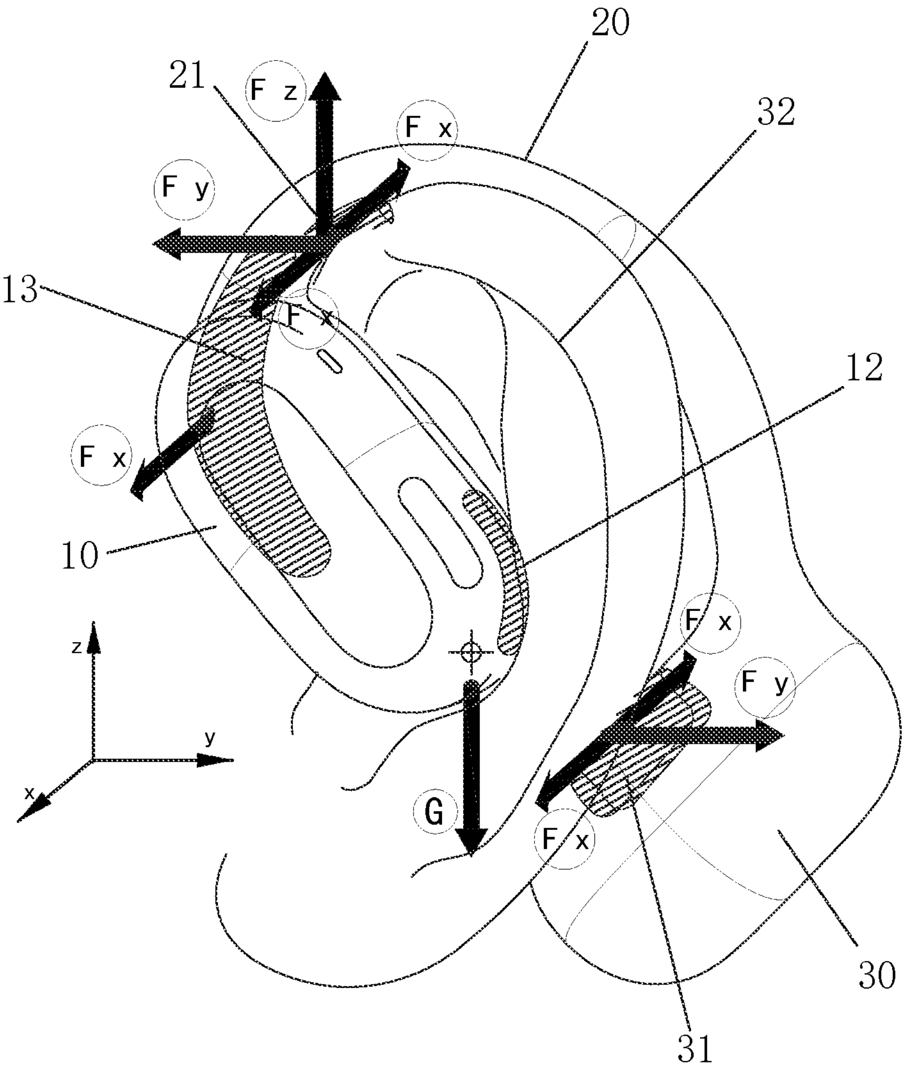
FIG. 9 is a typical stress distribution diagram of an earphone with a plurality of supporting portions according to the present application.

In the specific wearing process, there may be a plurality of wearing states, and each supporting portion of the earphone has different stress situations under different wearing states. Referring to FIG. 9, the most typical situation is that the third supporting portion 21, the fourth supporting portion 31, and the second supporting portion 13 are used as a supporting region to support the earphone. For better description, a coordinate system is introduced for further illustration. A lateral direction of the ear 32 serves as a positive direction of the X axis, a posterior direction of the ear 32 serves as a positive direction of the Y axis, and a superior direction of the ear 32 serves as a positive direction of the Z axis. Thus, the gravity G of the earphone is vertically downward. A force on the third supporting portion 21 is $F\mathbf{21}a=F\mathbf{21}z+F\mathbf{21}y+F\mathbf{21}z$, a force on the second supporting portion 13 is $F\mathbf{13}a=F\mathbf{13}x$, and a force on the fourth supporting portion 31 is $F\mathbf{31}a=F\mathbf{31}z+F\mathbf{31}y+F\mathbf{31}z$, so the gravity is $G=F\mathbf{21}a+F\mathbf{13}a+F\mathbf{31}a$.

Figure 10:
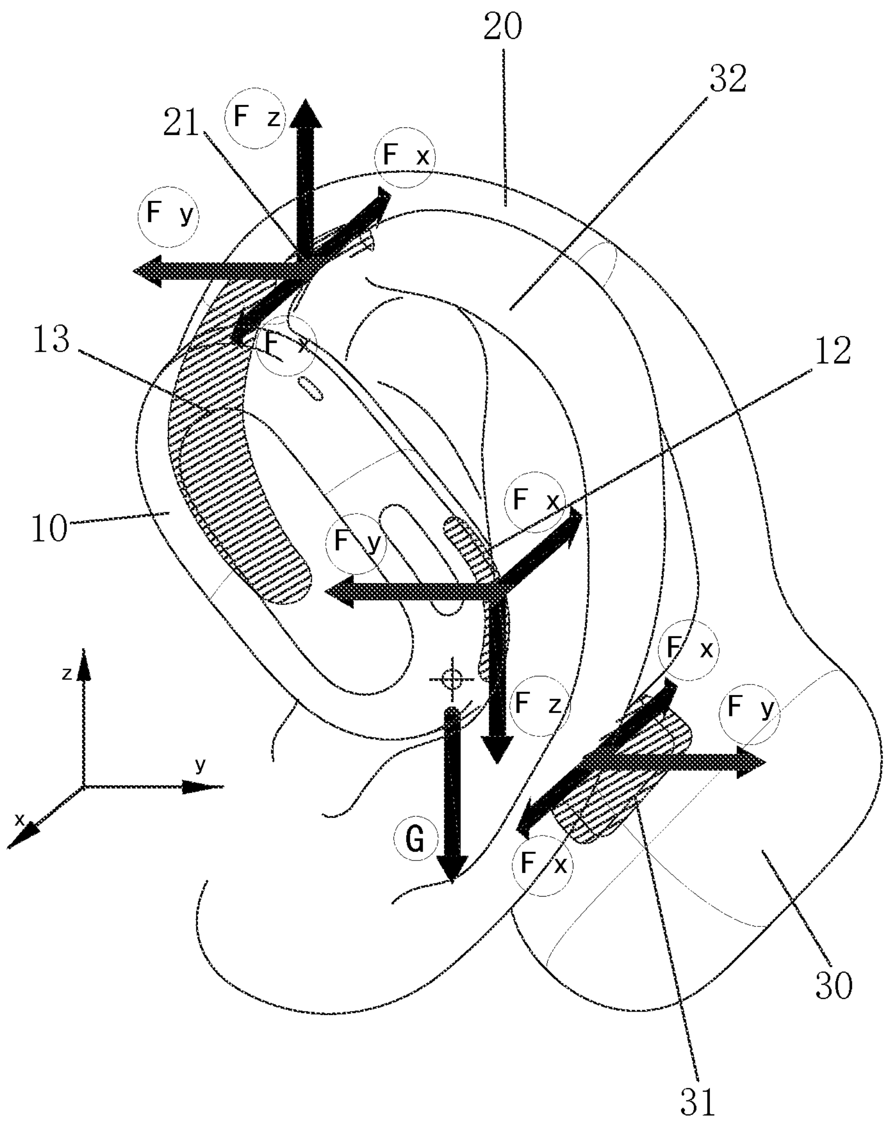
FIG. 10 is another typical stress distribution diagram of an earphone with a plurality of supporting portions according to the present application.

Referring to FIG. 10, another typical stress distribution situation is that the first supporting portion 12, the third supporting portion 21, and the fourth supporting portion 31 are used as a supporting region to support the earphone. Similarly, a coordinate system is introduced for further illustration. The lateral direction of the ear 32 serves as the positive direction of the X axis, the posterior direction of the ear 32 serves as the positive direction of the Y axis, and the superior direction of the ear 32 serves as the positive direction of the Z axis. Thus, the gravity G of the earphone is vertically downward. A force on the first supporting portion 12 is $F\mathbf{12}b=F\mathbf{12}x+F\mathbf{12}y+F\mathbf{12}z$, a force on the third supporting portion 21 is $F\mathbf{21}b=F\mathbf{21}z+F\mathbf{21}y+F\mathbf{21}z$, and a force on the fourth supporting portion 31 is $F\mathbf{31}b=F\mathbf{31}z+F\mathbf{31}y+F\mathbf{31}z$, so the gravity is $G=F\mathbf{12}b+F\mathbf{21}b+F\mathbf{31}b$.

Compared with the prior art, the present application has the following beneficial effects: with the design of the supporting regions of the earphone, the earphone fits the ear 32 better, stress is more uniform, the earphone is prevented from falling off or getting loose easily, fatigue of the ear 32 caused after long-time wearing is relieved, and the comfort of wearing is improved.

The above embodiments are merely used to further illustrate the technical content of the present application, so as to be more easily understood by the reader, but it does not mean that the implementations of the present application are limited thereto, and any technical extension or re-invention made in accordance with the present application is protected by the present application. It is intended that the scope of protection of the present application be defined by the claims appended hereto.

What is claimed is:

1. An earphone with a plurality of supporting portions, comprising a main cavity, an ear hook, and a secondary cavity, wherein the main cavity is connected to the secondary cavity through the ear hook; the main cavity is used for mounting of a loudspeaker, and located on an anterior side of an ear; a sound outlet is provided in a position of the main cavity close to an ear canal; the ear hook is used for surrounding a superior side and a posterior side of the ear; and the secondary cavity is used for making contact with the posterior side of the ear; the main cavity abuts against an antihelix.

2. The earphone with a plurality of supporting portions according to claim 1, wherein the main cavity is provided with a first supporting portion for abutting against the antihelix; and the first supporting portion is in surface contact or point contact with an auricle.

3. The earphone with a plurality of supporting portions according to claim 1, wherein the main cavity is provided with a second supporting portion for abutting against the skin on an anterior side of a helix, an anterior part of the helix, a supratragic notch, and a superior part of a tragus; and the second supporting portion is in a surface contact manner.

4. The earphone with a plurality of supporting portions according to claim 1, wherein the ear hook is provided with a third supporting portion for abutting against a superior auricular root, a groove of the superior antihelix crus, and a prominence of the triangular fossa; and the third supporting portion is in a surface contact manner.

5. The earphone with a plurality of supporting portions according to claim 1, wherein the secondary cavity is provided with a fourth supporting portion for abutting against a prominence of the cymba concha, a groove of the helix crus, a groove of the antihelix, and a prominence of the cavum concha; and the fourth supporting portion is in a surface contact manner.

6. The earphone with a plurality of supporting portions according to claim 1, wherein the ear hook is made of a memory material.

7. The earphone with a plurality of supporting portions according to claim 1, wherein the secondary cavity is provided with a mounting cavity for mounting of an electronic component.

8. The earphone with a plurality of supporting portions according to claim 1, wherein the main cavity, the ear hook and the secondary cavity are wrapped with a soft rubber layer.

9. The earphone with a plurality of supporting portions according to claim 1, wherein the ear hook is of a tubular structure.

10. The earphone with a plurality of supporting portions according to claim 1, wherein a rear sound hole is provided in one side of the main cavity facing away from the ear canal.

* * * * *